United States Patent Office 3,302,921
Patented Feb. 7, 1967

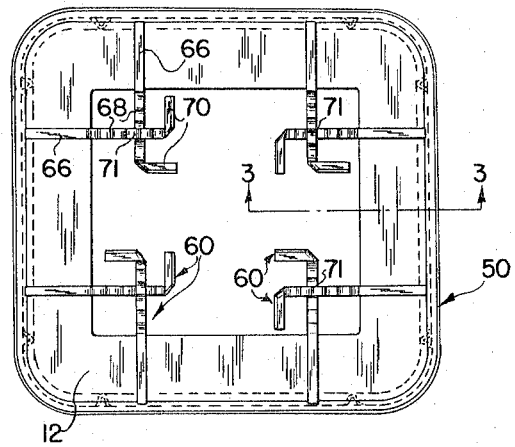
FIG. 2
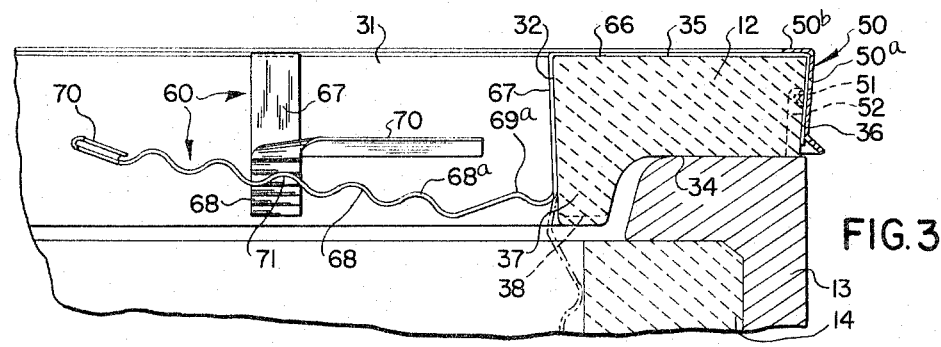
FIG. 3
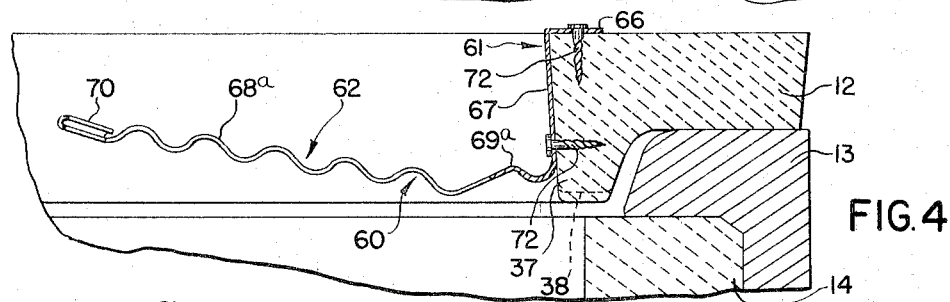
FIG. 4
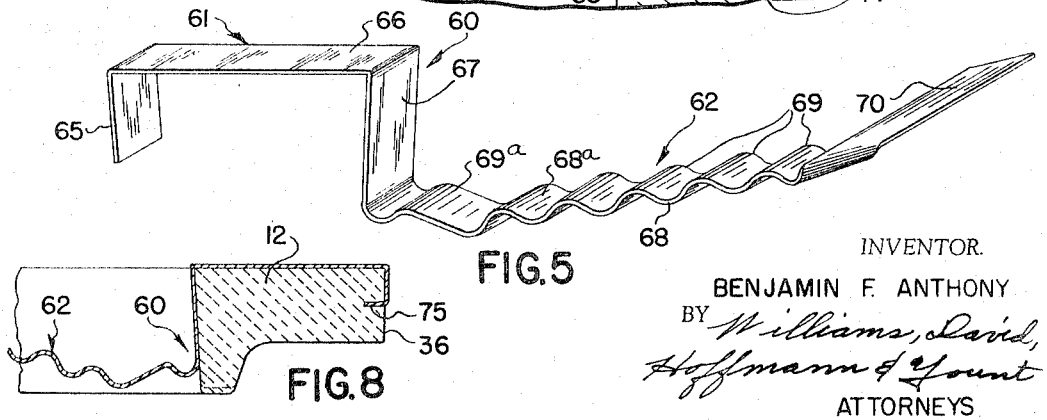
FIG. 5
FIG. 8 ably

3,302,921
ATTACHING MEANS FOR BOTTOM RING
Benjamin F. Anthony, Cleveland Heights, Ohio, assignor to Oglebay Norton Company, Cleveland, Ohio, a corporation of Ohio
Filed May 15, 1963, Ser. No. 280,530
4 Claims. (Cl. 249—202)

The present invention relates to improvements in hot tops and hot topping operations and, particularly, to an improved means for securing or fastening a bottom ring onto a hot top structure.

An important object of the present invention is to provide a new and improved hot top bottom ring assembly, including an attaching clip of a type which requires no mating part on the hot top.

Another important object of the present invention is the provision of a new and improved fastening means for securing a hot top bottom ring to an insulated hot top unit including a hot top casing, which fastening means requires no receiving opening or mating part in the hot top casing, thus simplifying manufacture of the casing and attachment of the bottom ring and avoiding the problems which occur when the receiving openings in the casing are plugged by metal splashes.

Another important object of the present invention is the provision of a new and improved clip member for securing a bottom ring onto a hot top structure and including a portion adapted to be received and held in a lining of the hot top.

Another important object of the present invention is to provide a ring and an attaching clip for securing the ring to an insulated hot top unit and which has a portion which extends beyond the ring to project into the insulated hot top unit when in use but which does not project beyond the ring during shipping and handling.

Another object of the present invention is to provide a new and improved hot top bottom ring having an attaching clip thereon which has an attaching portion to be imbedded in a lining of the hot top and is adapted to be moved from a storage position to an operative position by a mandrel for applying the lining.

A further object of the present invention is the provision of a new and improved clip member for securing a bottom ring member on an insulated hot top unit having a layer of veneer material covering a refractory brick layer, and wherein the veneer material is applied to the brick layer in a plastic form by a make-up machine which includes a mandrel or machine element which is positioned in the insulated unit and wherein the veneer clip is disposable in a position wherein one portion thereof extends so as to be engaged by the mandrel or machine element and automatically moved to a position lying along the brick layer by the mandrel or machine element when the mandrel or machine element is positioned in the insulated hot top unit, and the one portion is then engulfed by the veneer material and is securely imbedded and anchored therein when the veneer material hardens.

A further object of the present invention is the provision of a new and improved clip member, as noted in the next preceding paragraph, wherein the one portion of the clip, which is imbedded in the veneer lining, is provided with a means which cooperates with the veneer lining to resist forces acting axially of the hot top which tend to pull the clip member from the veneer lining.

Further objects and advantages of the present invention will be apparent to those skilled in the art to which the invention relates from the following detailed description thereof made with reference to the accompanying drawings, wherein:

FIG. 2 is a top plan view of an assembly used in the formation of the hot top illustrated in FIG. 1;

FIG. 3 is a sectional view of the assembly shown in FIG. 2, taken along the section line 3—3 thereof, and illustrating the position of the assembly on a hot top casing prior to operation of the make-up machine;

FIG. 4 is a view similar to FIG. 3 but illustrating an assembly of modified form;

FIG. 5 is an enlarged perspective view of a veneer clip for securing a bottom ring in a hot top and forming a part of the hot top illustrated in FIG. 1;

FIG. 8 is a view similar to FIG. 3 but illustrating an assembly of modified form.

Figure 1:
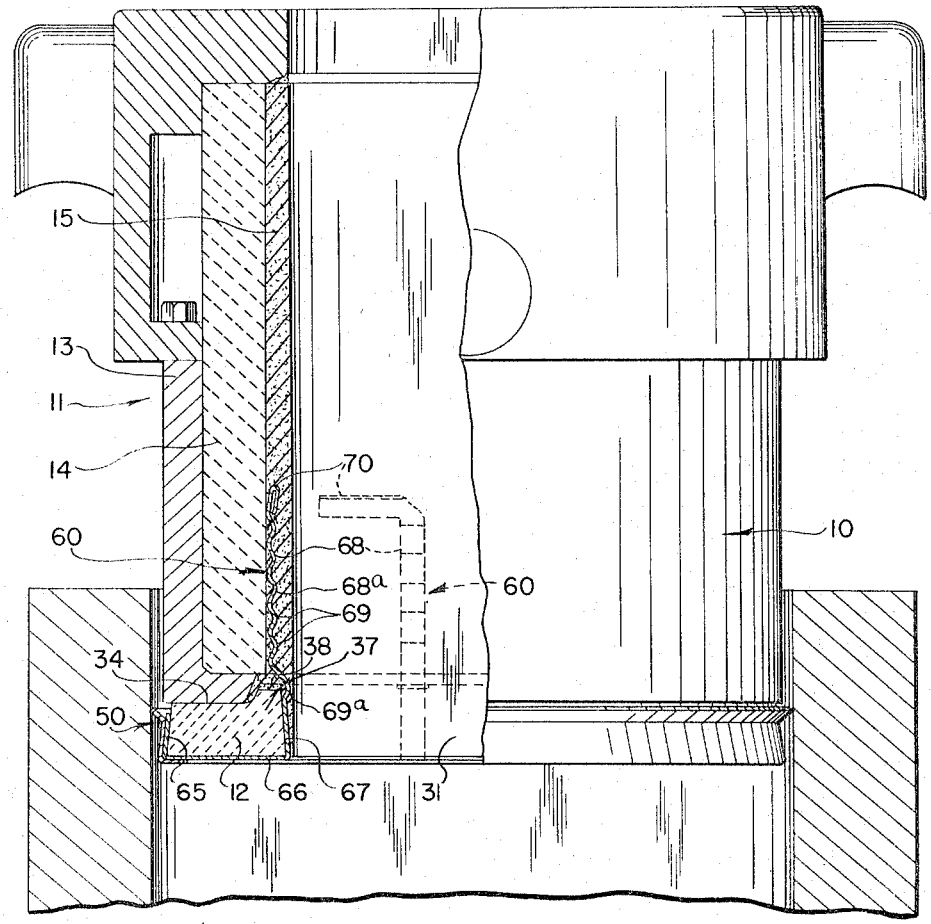
FIG. 1 is a sectional view, partly in elevation, of a hot top embodying the present invention.

The present invention provides an attaching means for securing a bottom ring on an insulated unit to form a hot top. Referring to the drawings, a hot top 10 formed of an insulated unit 11 and bottom ring 12 is shown in FIG. 1 positioned on an ingot mold. The hot top 10 functions in a well known manner, as will be apparent from the description below, to maintain a molten mass of metal at the top end of the ingot to feed the shrinkage cavity upon cooling of the ingot.

In the preferred and illustrated embodiment, the insulated unit 11 includes a hot top casing 13 having a semipermanent insulating layer 14 of relatively soft insulating refractory material such as insulating firebrick or insulating castable. The insulating layer 14 is covered with a protective layer or lining of veneer material 15 which forms the sidewalls of the opening through the hot top through which molten metal is poured when the hot top is positioned on the ingot mold and forms a part of the insulated unit 11. The protective layer 15 is a one use layer and is replaced each time the hot top is used.

The refractory bottom ring member 12 is positioned on the bottom end of the hot top casing 13 so as to underlie the hot top casing 13 and brick lining 14 when the hot top is in use. The bottom ring 12 has an opening 31 therethrough defined by an inner peripheral surface 32 of the bottom ring. The bottom ring 12 also includes horizontally extending top and bottom surfaces 34 and 35, respectively, which are intersected by the inner peripheral surface 32 and an outer peripheral surface 36. The top horizontally extending surface 34 of the bottom ring has an upstanding or shoulder portion 37 adjacent the inner peripheral surface 32. The shoulder or ledge portion 37 has horizontally spaced recesses 38 therein, the purpose of which will be described hereinbelow.

A wiper strip 50 is preferably attached to the bottom ring 12 as shown in United States Patent No. 3,058,182.

The wiper strip 50 has flange portion 50a which extends along the outer periphery of the bottom ring and a flange portion 50b extending along the bottom of the ring. The wiper strip 50 may be attached to the bottom ring in any one of numerous different ways and is shown herein as having portions 51 crimped into openings 52 formed in the outer peripheral surface 36 of the bottom ring. By attaching the wiper strip to the bottom ring, a unitary assembly is formed and the bottom ring and wiper strip are positioned on the hot top casing at the same time. It should be understood, however, that the wiper strip need not be preassembled with the bottom ring, but may be positioned on the hot top in a separate operation. The bottom ring 12 and wiper strip attached thereto are mounted onto the hot top by fastening means which includes a plurality of clip members or veneer clips 60. The clip members 60 are of identical construction and only one clip member will be described in detail hereinbelow.

Each veneer clip 60 is an elongated sheet metal member or strap having a first section 61 adapted to embrace and support the bottom ring 12 and a second section 62 adapted to be imbedded or engulfed in the veneer lining 15 and securely anchored therein in the position illustrated in FIG. 1 to hold the bottom ring on the hot top. The section 61 thereof is preferably attached to the bottom ring 12 and is shown having a generally U-shape for receiving or embracing the ring 12. The U-shaped section 61 includes a terminal planar leg portion 65 forming one leg of the U, a planar portion 67 forming the other leg of the U and a connecting planar portion 66 extending substantially perpendicular to the leg portions.

The section 61 of each veneer clip may be said to constitute an attaching or connecting means which is effective to hold the veneer clip in position on the bottom ring. The portion 66 is of a length substantially equal to the width of the bottom surface 35 of the bottom ring, and when the clip 60 is supported on the bottom ring, portion 66 engages the bottom surface 35 of the bottom ring. Before assembly of the clip to the bottom ring, leg portions 65, 67 may converge sufficiently so that the distance between the leg portions 65, 67 at their outer ends is preferably slightly less than the width of the bottom ring at the corresponding location. This will cause these portions to tightly hug the outer and inner peripheral surfaces 36, 32, respectively, when the clip is assembled and frictionally hold the veneer clip 60 in position on the bottom ring 12.

The section 62 of the veneer clip is connected to the end of the leg portion 67 opposite to the end joined to the cross portion 66, and is swingable relative thereto from a storage and shipping position to a generally vertical operative position shown in FIG. 1. In the illustrated embodiment the clip 60 is a one piece clip formed of bendable non-resilient material and the section 62 is swingable by bending it around its line of juncture with the leg 67. The section 62 of the veneer clip includes an elongated portion 68 having a plurality of undulations or corrugations 69 thereon which extend outwardly from the plane of portion 68 and transversely thereof and at an angle to the side wall of the hot top when positioned therein. The portion 68 may be connected at its end to a horizontal portion 70 which extends crosswise of the portion 68 and parallel to the axis of the corrugations 69. The portion 70 is sloped upwardly and outwardly from the inner surface 68a of portion 68 for a purpose to be described hereinbelow. The corrugation 69a which is adjacent the portion 67 of the clip extends outwardly from the portion 68 further than the other corrugations, for a purpose also to be described hereinbelow.

Preferably, the necessary veneer clips are attached to a bottom ring by the manufacturer of the bottom ring, and the bottom ring with the veneer clips attached thereto are shipped as an assembly or unit to the hot top user.

The number of veneer clips attached to a bottom ring is dictated by the size of the ring, the size of the hot top to receive the ring, and the holding power of each clip. The assembly illustrated in FIG. 2 includes eight clips 60 attached to the bottom ring 12, along with the wiper strip 50, the veneer clips extending between the wiper strip 50 and bottom ring 12 and being held in position thereby.

In the assembly illustrated in FIG. 2, the sections 61 of the veneer clips 60, included in the assembly, receive the bottom ring member 12 and frictionally engage the bottom ring. The sections 62 of the veneer clips extend into the opening through the bottom ring member and terminate therein. The sections 62 of certain of the clips may overlap and engage as at 71 in the opening in the bottom ring. Thus, the veneer clips have no portions which project outwardly away from the bottom ring, which portions would tend to create problems during shipment of the assembly. It should be understood, of course, that since the manufacturer of the bottom ring attaches the veneer clips to the bottom ring prior to the shipment to the hot top user, the hot top user does not have to maintain an inventory of veneer clips for securing the bottom ring on the hot top.

Figure 6:
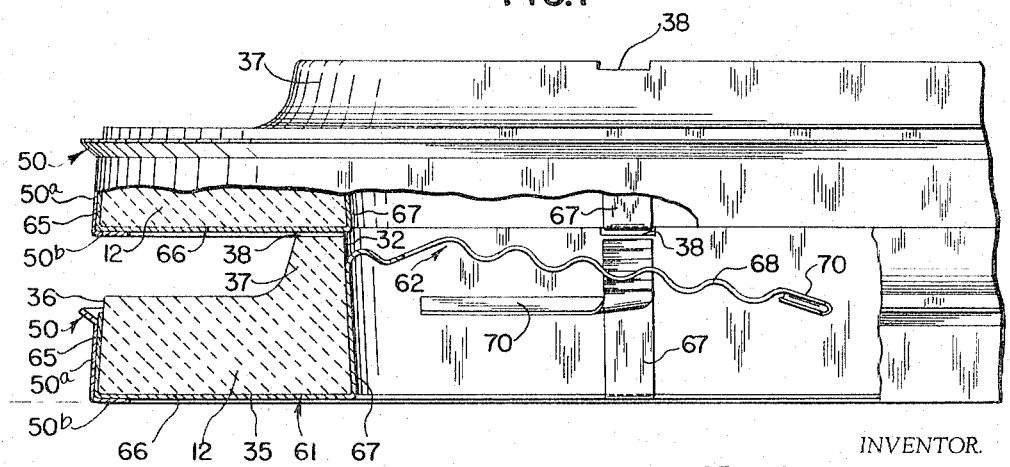
FIG. 6 is a view illustrating a stack of the assemblies illustrated in FIG. 2.
Figure 7:
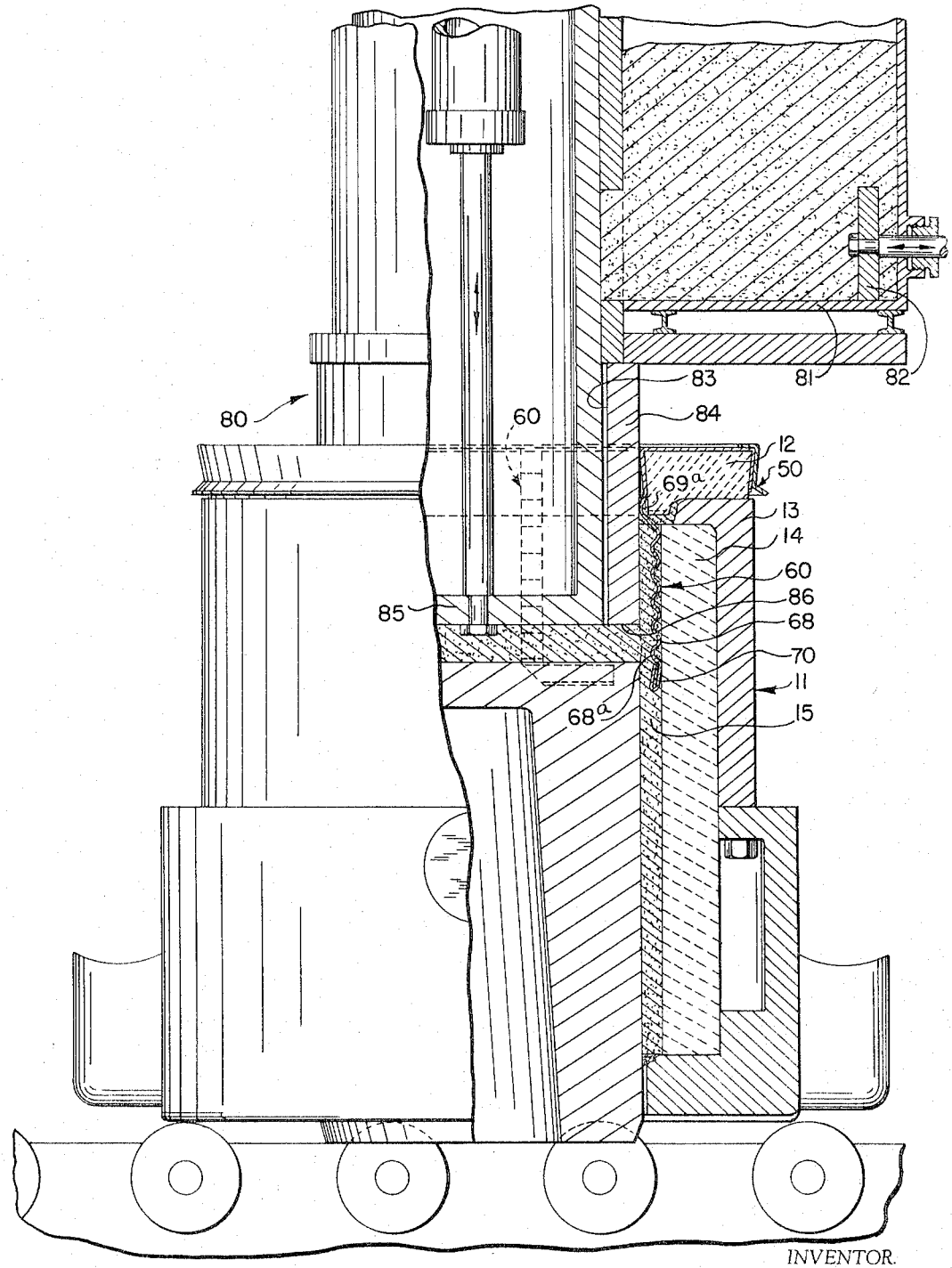
FIG. 7 is a sectional view, partly in elevation, of a hot top and parts of a make-up machine for applying a veneer lining to the hot top, and illustrating the present invention.

When assemblies of bottom rings with veneer clips secured thereto are shipped, they are commonly palletized or stacked, as shown in FIG. 6, and the recesses 38 in the ledge portion of each bottom ring, heretofore mentioned, facilitate the stacking and shipping of the assemblies. The bottom rings are stacked so that the portion 66 of the veneer clips on one bottom ring in the stack is received in a corresponding recess 38 in the ledge portion of the next bottom ring in the stack. Thus, no metal portion of a veneer clip on one ring in a stack engages the refractory material of the next ring in the stack. Engagement of the veneer clip and the refractory material of the next bottom ring would readily permit sliding movement between adjacent bottom rings. The provision of the recesses 38 permit the refractory material of one ring in the stack to engage the refractory material of the next ring of the stack, and since the refractory material of the bottom rings is not as smooth as the sheet metal of the veneer clips, engagement of the bottom rings in the stack tends to frictionally prevent sliding of one ring in the stack relative to the next ring in the stack.

While the veneer clips 60 described above are held on the bottom ring 12 by means of the wiper strip 50, it is to be understood that the veneer clips may be modified somewhat and secured to the bottom ring by other means. For example, the veneer clip might be nailed to the bottom ring as illustrated in FIG. 4, wherein a plurality of screw nails 72 are provided extending through the portions 66 and 67 of the veneer clip and securing these portions in position to hold the veneer clip on the bottom ring. Alternatively, the veneer clip might be provided with lugs or tabs which extend perpendicular to the portions 66 and 67 of the veneer clip and which are imbedded in the bottom ring to secure the veneer clip on the bottom ring. Other means may also be utilized, as well, to secure a veneer clip on the bottom ring, for example, a portion of the veneer clip could be imbedded in the bottom ring, or could be secured to the bottom ring by a suitable adhesive. Moreover, the veneer clip could be positioned in a slot formed in the inner peripheral surface 32 of the bottom ring 30, and secured therein.

FIG. 8 shows a modification of the present invention wherein a portion 75 of a veneer clip 60 is imbedded in the bottom ring 12 and extends into the bottom ring through the outer peripheral surface 36 thereof and the portion 62 of the clip extends into the opening through the ring. This modified construction may be used where a wiper strip is used which is different from the wiper strip shown in FIG. 2.

According to the present invention, when the assembly of the bottom ring and veneer clips is received by the hot top user, the assembly is positioned on the hot top casing with the layer or insulating brick therein in the position illustrated in FIG. 3. It should be understood that FIG. 3 illustrates the hot top in a position inverted from its normal position when in use. This inverted position is normally the position of the hot top when being made up. With the assembly of the veneer clips and bottom ring positioned as shown in FIG. 3, the hot top is conditioned for receipt of the lining of veneer material.

The veneer material is applied to the brick layer 14 in a plastic condition by a make-up machine 80. The make-up machine 80 is of the general type disclosed in detail in United States Patent No. 2,896,266. The make-up machine 80 includes a hopper 81 containing a supply of fictile veneer material to be applied to the hot top. The veneer material in the hopper 81 is moved by a pusher 82 into a cavity 83 in a mandrel 84. The mandrel 84 is inserted into the interior of the hot top 10, and when in this position, a ram 85 moves into the cavity 83 in the mandrel 84 and forces the veneer material therein from the cavity 83, through a plurality of ports 86, only one of which is shown, in the mandrel 84, and into covering relation with the insulating lining 14. After the fictile veneer material is applied to the lining 14, the mandrel 84 is withdrawn from the hot top and the veneer lining is hardened by drying.

It should be understood that the sections 62 of the veneer clips which extend into the opening of the bottom ring, are positioned in the path of movement of the mandrel 84 when the veneer clips and bottom rings are positioned on the hot top casing. As the mandrel 84 is inserted into the hot top it engages the sections 62 of the veneer clips and causes the sections 62 to swing or bend relative to the section 61 from their shipping position illustrated in FIG. 3 to a vertically extending operative position lying along the refractory insulating lining 14. The corrugations 69a of each veneer clip extend outwardly further than the other corrugations thereof and engage the outer peripheral surface of the mandrel, and this engagement causes the sections 62 of the veneer clips and the other corrugations thereof to be held closely adjacent the lining 14. The outer periphery of the mandrel 84 may be provided with cams or lugs, not shown, for engaging the sections 62 of the clips to bend the sections 62 into position closely adjacent the lining 14.

When the veneer clip is in an operative position lying along the lining 14 and extending substantially parallel to the opening through the hot top, the ram 85 of the make-up machine 80 is actuated to force the veneer material through the ports in the mandrel and into covering relation with the lining 14. The section 62 of each veneer clip is engulfed or imbedded in the veneer lining and, when the veneer material is hardened, is securely anchored in the veneer lining 15.

The corrugations and the end terminal portion 70 of the section 62 of the veneer clip comprise means for resisting movement of the veneer clip 60 relative to the veneer lining, after the veneer lining has been dried. The corrugations present planar surfaces which cooperate with the veneer lining and are effective to provide a force sufficient to resist a force at least as great as a force acting substantially parallel to the axis of the opening through the hot top and of a magnitude equal to the weight of the bottom ring and wiper strip. Thus, when the bottom ring is inverted to its use position from its make-up position shown in FIG. 1, the veneer clips securely hold the bottom ring onto the hot top casing. The portion 70 gives the veneer clip additional holding power, and the aforementioned slope of the portion 70 is such as to cause the portion 70 to push against the lining 14 if a force is applied to the clip acting in a downward direction parallel to the axis of the opening through the hot top.

It should be understood that while the corrugations 69 and the portion 70 comprise means cooperable with the veneer layer 15 to resist movement of the clips from the veneer layer, other such means may be provided. For example, tabs may be punched out of the section 62 to extend perpendicular thereto and would thus prevent movement of the clips relative to the veneer lining. Moreover, the portion 70 may not be necessary in all applications of the present invention and could be eliminated in certain situations where the resistance force provided thereby is not necessary.

It should thus be apparent from the above description that by the use of the veneer clip disclosed herein, the make-up of a hot top is greatly simplified in that the fastening means for securing the bottom ring to the insulated hot top unit 11 is placed in operative position at the time that the veneer lining 15 is applied to the insulating layer 14, and thus no separate or manual operation is required or necessary as in the prior art wherein bottom ring attaching clips are manually positioned in openings in the casing 12 after the veneer layer is applied. Moreover, the veneer clips 60 are not received in openings in the hot top casing 13, and thus the casing 13 requires no receiving openings therein.

While the veneer clip 60 disclosed above is made out of a sheet metal material which is non-resilient, in the sense that when it is bent any substantial amount it stays in the position to which it is bent and does not tend to return to the position it had before it was bent, it should be apparent from the above description that the veneer clip might be made of other materials which may or may not be resilient. It may comprise a wire-like member having one section adapted to be secured to the bottom ring and a second section adapted to be imbedded in the veneer lining of the hot top. The section to be imbedded in the veneer lining could have a plurality of flat wiggles formed therein or spirals which would tend to resist movement of the wire from the veneer after the veneer has been dried and would function similar to the corrugations on the portion 62 of the veneer clip 60 described hereinabove.

While the preferred embodiment of the present invention has been described in considerable detail it should be apparent that certain changes and modifications therein could be made by those skilled in the art, and it is intended to hereby cover all adaptations, modifications and changes which come within the scope of the appended claims.

Having described my invention, I claim:

1. An assembly for use in a hot top comprising, a hot top bottom ring member having upper and lower surfaces, an outer peripheral surface intersecting said upper and lower surfaces and an inner surface defining an opening therethrough and intersecting said upper and lower surfaces and an elongated clip member for securing said bottom ring member to an insulated hot top unit, said clip member including a first portion attached to said ring member and a second portion having a portion extending substantially parallel to the axis of the opening through said bottom ring along said inner surface of said opening in said bottom ring, said second portion projecting beyond said ring and including means for connection with said insulated hot top unit.

2. An assembly for use in a hot top as defined in claim 1 wherein said second portion of said clip member is swingable to said position from a first position located in the opening in said bottom ring.

3. A method of fastening a bottom ring on a hot top unit which includes an insulating refractory lining comprising the steps of providing a clip member having a first portion adapted to be secured to said insulated unit and a second portion adapted to support said bottom ring when said first portion is secured to said insulated unit, positioning said clip member with said second portion in position for supporting said bottom ring and said first portion lying along said insulating refractory lining, imbedding said first portion in a layer of fictile veneer material applied to the insulating refractory lining, and hardening said veneer material to anchor said first portion in said veneer layer.

4. A method of fastening a bottom ring on an insulated unit which includes an insulating refractory lining and a layer of protective veneer applied to the lining through a mandrel comprising the steps of providing a clip member having a first portion secured to the bottom ring and a second portion adapted to be secured to said insulated unit, positioning the clip member with said second portion extending into the path of movement of a mandrel through which the veneer material is applied to the refractory lining, engaging said second portion of the clip extending into the path of movement of the mandrel with the mandrel and bending the clip into a position closely lying along the insulating refractory lining upon movement of the mandrel into position for applying the veneer material, and imbedding the second portion of the veneer clip in a layer of fictile veneer material overlying the insulating refractory lining, and hardening the veneer material to anchor the second portion of the clip in the veneer layer.

References Cited by the Examiner

UNITED STATES PATENTS

| | | | |
|---|---|---|---|
| 467,491 | 1/1892 | Anderson | 52—714 X |
| 647,705 | 4/1898 | Rieseck | 52—714 X |
| 978,948 | 12/1910 | Shean | 52—714 X |
| 1,116,928 | 11/1914 | Sanderson | 52—712 |
| 1,117,908 | 11/1914 | Ridgeway | 52—712 X |
| 1,738,209 | 12/1929 | Rowe | 249—202 |
| 2,029,058 | 1/1936 | Charman | 249—201 |
| 2,262,130 | 5/1940 | Bagley | 52—714 |
| 2,279,644 | 4/1942 | Spalding | 52—714 X |
| 2,952,055 | 9/1960 | Gottschalk | 249—205 |
| 3,014,254 | 12/1961 | Marcec | 249—202 |
| 3,091,826 | 6/1963 | Bigge | 22—200 X |
| 3,110,942 | 11/1963 | Thiem et al. | |

FOREIGN PATENTS

| | | |
|---|---|---|
| 1,240,911 | 11/1960 | France. |
| 371,408 | 4/1932 | Great Britain. |

J. SPENCER OVERHOLSER, *Primary Examiner.*

V. K. RISING, *Assistant Examiner.*

UNITED STATES PATENT OFFICE
CERTIFICATE OF CORRECTION

Patent No. 3,302,921                        February 7, 1967

Benjamin F. Anthony

It is hereby certified that error appears in the above numbered patent requiring correction and that the said Letters Patent should read as corrected below.

Column 6, line 56, for "portion", second occurrence, read -- position --.

Signed and sealed this 17th day of October 1967.

(SEAL)
Attest:

Edward M. Fletcher, Jr.                        EDWARD J. BRENNER
Attesting Officer                                 Commissioner of Patents